United States Patent [19]
Uchino et al.

[11] Patent Number: 5,764,193
[45] Date of Patent: Jun. 9, 1998

[54] DIVERSITY ANTENNA FOR RADIO COMMUNICATIONS

[75] Inventors: Sigeru Uchino; Ping Wang, both of Tokyo, Japan

[73] Assignee: Harada Kogyo Kabushiki Kaisha, Tokyo, Japan

[21] Appl. No.: 399,510

[22] Filed: Mar. 7, 1995

[30] Foreign Application Priority Data

Mar. 7, 1994 [JP] Japan ................................. 6-035983

[51] Int. Cl.$^6$ ................................................. H01Q 21/00
[52] U.S. Cl. ....................... 343/725; 343/727; 343/722; 343/794; 343/795
[58] Field of Search ........................... 343/790, 791, 343/792, 794, 795, 828, 722, 727, 851, 725; H01Q 1/52, 21/10

[56] References Cited

U.S. PATENT DOCUMENTS

| | | | |
|---|---|---|---|
| 2,485,457 | 10/1949 | Potter | 343/791 |
| 3,879,735 | 4/1975 | Campbell et al. | 343/792 |
| 4,038,662 | 7/1977 | Turner | 343/794 X |
| 4,117,492 | 9/1978 | Arnold et al. | 343/792 X |
| 4,940,989 | 7/1990 | Austin | 343/791 X |
| 5,412,392 | 5/1995 | Tsunekawa | 343/702 |

*Primary Examiner*—Donald T. Hajec
*Assistant Examiner*—Tan Ho
*Attorney, Agent, or Firm*—Koda & Androlia

[57] ABSTRACT

A diversity antenna for radio communications including a pair of conductive thin-film patterns used for a first antenna and another pair of conductive thin-film patterns used for a second antenna, the thin-film patterns being installed on a printed circuit board along the direction of the length of the circuit board; a first choke coil which is used to stop a leakage current from the first antenna and cause attenuation of a coupling current from the second antenna, the first choke coil being installed at a location where the leakage current distribution of the first antenna reaches the maximum in a feeder cable connected to the first antenna; and a second choke coil which is used to stop the leakage current from the second antenna, the second choke coil being installed at a location where the leakage current distribution of the second antenna reaches the maximum in a feeder cable for the second antenna.

2 Claims, 7 Drawing Sheets

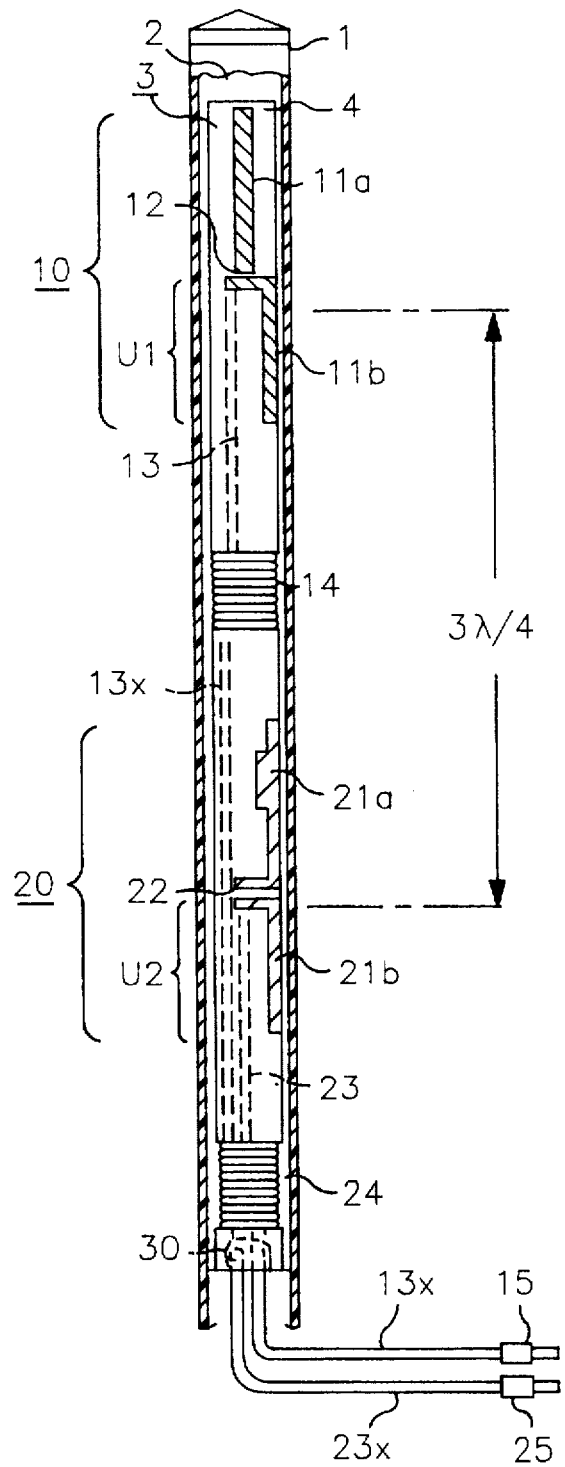
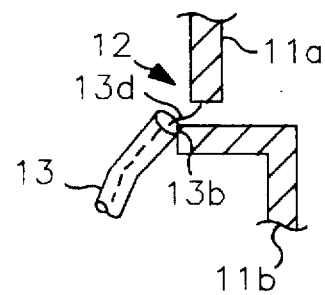
FIG. 1B
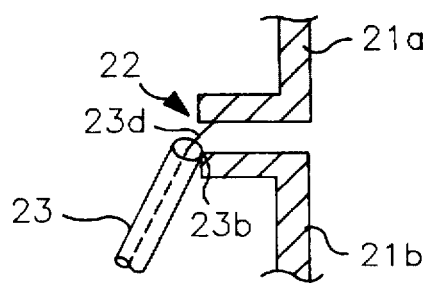
FIG. 1C
FIG. 1A

DIVERSITY ANTENNA FOR RADIO COMMUNICATIONS

BACKGROUND OF THE INVENTION

1. Field of the Invention

The present invention relates to a diversity antenna for radio communications which can be used in communications systems such as automobile telephones, portable telephones, etc.

2. Prior Art

In conventional antennas of this type as disclosed in, for example, Japanese Utility Model Application Laid-Open No. 2-32218, the antenna element is constructed by combining so-called "pull-out parts" such as pipes, etc. In these antennas, a leakage current generated as a result of connecting unbalanced cables to balanced antennas is stopped by providing a shovel top with the antennas, and a coupling current caused by the coupling of the antennas and the feeder cable, etc. is prevented by passing a feeder cable through the pipes.

In the conventional antennas described above, since the antenna element is constructed by combining the so-called "pull-out parts" such as pipes, etc., the antennas have various problems. The structure is complicated which causes high manufacturing costs. In addition, the weight of the antenna is also increased, etc.

One conceivable means to solve the problems is to form an antenna element that consists of conductive thin-film patterns provided on a printed circuit board so that feeder cables are mounted on the printed circuit board. If such a construction is employed, it is at least possible to simplify the structure of the antenna and to reduce the cost and weight of the antenna.

However, in the above construction, it is not possible to provide a shovel top on the antenna, and it is also not possible to stop the leakage current. As a result, the leakage current creates a disturbance in the radiation pattern, causing a drop in the gain and causing the impedance characteristics to become unstable. Furthermore, since the respective feeder cables for the first and second antennas are installed in an exposed manner, a so-called "coupling current" tends to be induced, thus causing a deterioration in the antenna characteristics. Since no effective technical means of solving the problems has been developed in the past, no solution has yet been realized.

SUMMARY OF THE INVENTION

The object of the present invention is to provide a diversity antenna for radio communications as follows:

(1) A diversity antenna for radio communications which has a simple structure, a low cost of manufacture and a light weight compared to conventional antennas in which the antenna element is formed from pipes. In addition, the antenna has the necessary antenna characteristics.

(2) A diversity antenna for radio communications which has the necessary antenna characteristics with virtually no problems arising from the leakage current which is caused by connecting unbalanced cables to balanced antennas or from a coupling current that is induced as a result of coupling the antennas and cables.

In order to solve the problems and accomplish the object, the diversity antenna for radio communications according to the present invention is constructed as follows:

(1) The diversity antenna for radio communications of the present invention includes: conductive thin-film patterns used for a first antenna and conductive thin-film patterns used for a second antenna which are installed on a card-shaped printed circuit board in a direction of the length of the circuit board; a first choke coil which is used to stop the leakage current from the first antenna and to cause attenuation of coupling current from the second antenna, the first choke coil being installed at a position located at a distance of $\lambda/2$ from the feeding point of the first antenna where $\lambda$ is the wavelength of the electromagnetic waves in the frequency band used and at a location where the leakage current distribution of the first antenna reaches the maximum in the feeder cable for the first antenna; and a second choke coil which is used to stop the leakage current from the second antenna, the second choke coil being installed at a position separated from the first choke coil by a prescribed distance and at a location where the leakage current of the second antenna reaches the maximum in the feeder cable for the second antenna.

(2) The diversity antenna for radio communications of the present invention is the antenna as defined above wherein: the first antenna consists of a conductive thin-film pattern which is used for a main antenna element and a conductive thin-film pattern which is used as a folded element, both of them being installed on the card-shaped printed circuit board along the direction of the length of the circuit board; the feeder cable for the first antenna is a cable with one end thereof connected to a feeding point located between the adjacent ends of the conductive thin-film patterns and the other end thereof installed along the direction of the length of the circuit board; and a folding portion is formed by the feeder cable for the first antenna element and the conductive thin-film pattern which is used as a folded element.

(3) The diversity antenna for radio communications of the present invention is the antenna as defined above wherein: a coupling current distribution in an extended portion of the feeder cable for the first antenna is set so that the phase of the maximum point of the coupling current distribution and the phase of the maximum point of the antenna current distribution in the second antenna become the same, such a setting being obtained by setting the electrical length between the first and second choke coils to be an odd multiple of $\lambda/4$ and by adjusting and setting the electrical lengths (numbers of turns) of the first and second coils and the respective spacing between the feeder cables for the first and second antennas and the second antenna.

As a result of adopting the means described above, the present invention has the following function:

(1) In the diversity antenna for radio communications provided by the present invention, the antenna has a construction in which the conductive thin-film patterns used for a first antenna and conductive thin-film patterns used for a second antenna are installed on the card-shaped printed circuit board along the direction of the length of the circuit board, and the respective feeder cables are connected to the conductive thin-film patterns. Accordingly, the diversity antenna for radio communications has a simple construction, a low cost of manufacture and a light weight compared to conventional antennas in which the antenna element is formed from pipes.

The first choke coil which is used to stop the leakage current and cause the attenuation of coupling current is provided at a location where the leakage current distribution reaches the maximum in the feeder cable for the first antenna. Accordingly, the leakage current from the first antenna is stopped by the first choke coil, and there is no effect on the second antenna. In addition, the coupling current, which is induced in the extended portion of the feeder cable for the first antenna by the second antenna and which attempts to flow into the first antenna, is greatly attenuated by the first choke coil. Accordingly, the amount of the coupling current that flows into the first antenna is extremely small.

Moreover, the second choke coil which is used to stop the leakage current is installed at a location where the leakage current distribution reaches the maximum in the feeder cable for the second antenna. Accordingly, the leakage current from the second antenna is stopped by the second choke coil.

(2) In the diversity antenna for radio communications provided by the present invention, a folding portion is formed by the feeder cable for the first antenna and the conductive thin-film pattern which is used as a folded element. Accordingly, because of the relationship with the first choke coil, the coupling current flowing through the feeder cable for the first antenna and the coupling current flowing through the first antenna itself have the same level but opposite phases, resulting in that these two coupling currents deny and cancel each other. Accordingly, there is no danger that the coupling current on the first antenna side has a deleterious effect on the radiation pattern of the second antenna.

(3) In the diversity antenna for radio communications provided by the present invention, the coupling current distribution in the extended portion of the feeder cable for the first antenna is set so that the phase of the maximum point of the coupling current distribution and the phase of the maximum point of the antenna current distribution in the second antenna are the same. Accordingly, there is no danger that the coupling current induced in the extended portion of the feeder cable for the first antenna which passes alongside the second antenna has a deleterious effect on the radiation pattern of the second antenna.

BRIEF DESCRIPTION OF THE DRAWINGS

FIGS. 1(a)–1(c) is sectional views of the construction of a radio communication diversity antenna constituting a first embodiment of the present invention wherein FIG. 1 (a) illustrates the overall construction and FIGS. 1(b) and (c) illustrate the construction of the respective feeding points;

FIGS. 5a and 5b shows the results of actual measurements of the characteristics of the first antenna of the radio communication diversity antenna in the first embodiment of the present invention wherein FIG. 5(a) is a Smith chart, and FIG. 5(b) is an SWR characteristic diagram;

FIGS. 6a and 6b shows the results of actual measurements of the characteristics of the second antenna of the radio communication diversity antenna in the first embodiment of the present invention wherein FIG. 6(a) is a Smith chart and FIG. 6(b) is an SWR characteristic diagram;

FIGS. 7a and 7b shows the results of actual measurements of the vertical-plane radiation patterns of the radio communication diversity antenna in the first embodiment of the present invention wherein FIG. 7(a) shows the pattern of the first antenna and FIG. 7(b) shows the pattern of the second antenna.

DETAILED DESCRIPTION OF THE INVENTION

Figure 2:
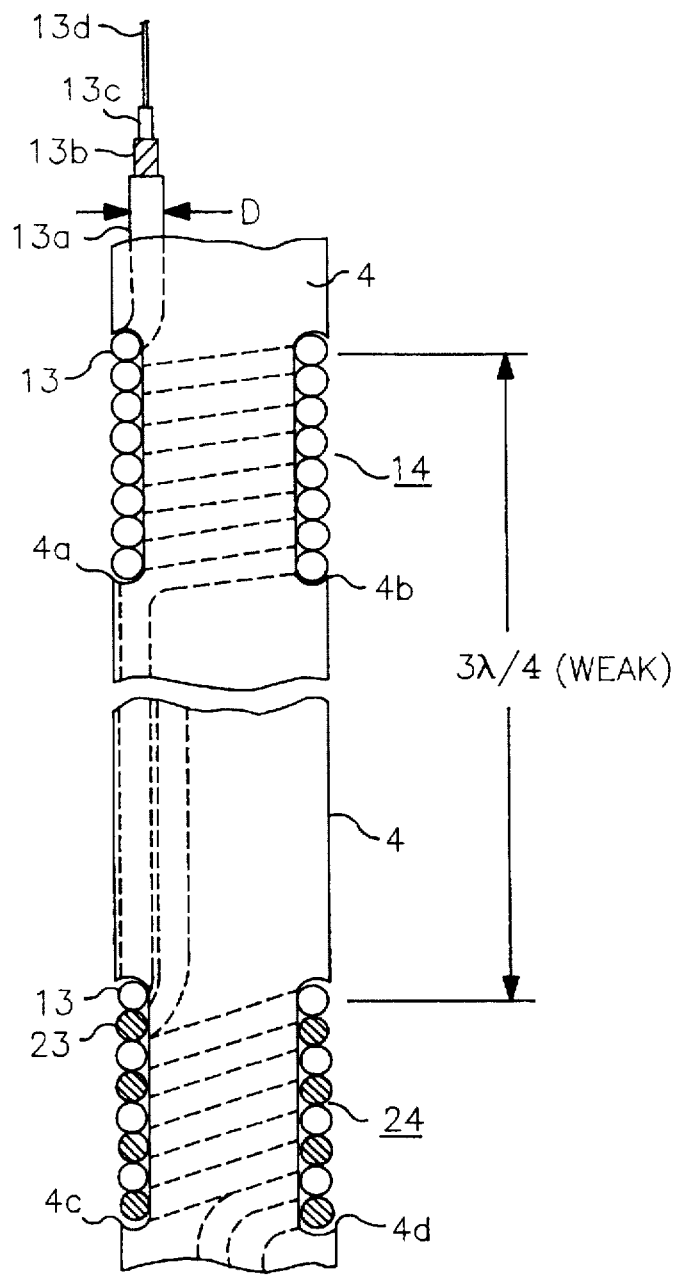
FIG. 2 is a partial sectional plan view of the construction of the first and second choke coils of the radio communication diversity antenna in the first embodiment of the present invention.

FIGS. 1 (a), (b) and (c) illustrate the structure of the diversity antenna for radio communications constituting an embodiment of the present invention. As shown in FIGS. 1 (a), (b) and (c), the diversity antenna for radio communications of the embodiment is constructed so that an antenna main body 3, which is enveloped by a shock-absorbing part 2 consisting of an insulating elastic material, is accommodated inside an outer tube 1 which is formed from, for example, a hard synthetic resin such as an FRP, etc. The antenna main body 3 is formed by installing various antenna components as described below on a long, slender card-shaped printed circuit board 4.

10 indicates a first antenna which is one of the constituent elements of the diversity antenna and is provided along the direction of the length of a printed circuit board. This first antenna 10 consists of a conductive thin-film pattern 11a, which is used for a main antenna element, and a conductive thin-film pattern 11b, which is used as a folded element.

20 indicates a second antenna which is the other of the constituent elements of the diversity antenna and is provided along the direction of the length of the printed circuit board. This second antenna 20 consists of a conductive thin-film pattern 21a, which is used for a main antenna element, and a conductive thin-film pattern 21b, which is used as a folded element.

The first antenna 10 and the second antenna 20 are provided so as to be separated from each other so as to form a space diversity antenna by a distance which is equal to an odd multiple of λ/4 (it is three times, that is, 3λ/4 in this embodiment) in which λ is the wave length of electromagnetic waves within the frequency band used.

As shown in FIG. 1 (b), one end of a coaxial first-antenna feeder cable 13 is connected to the feeding point 12 of the first antenna 10. More specifically, one end of the core conductor 13d of the feeder cable 13 is connected to the conductive thin-film pattern 11a which is used for a main antenna element, one end of the outer conductor 13b of the feeder cable 13 is connected to the conductive thin-film pattern 11b which is used as a folded element, and the rest of the first-antenna feeder cable 13 is provided so as to extend along the direction of the length of the circuit board 4. Thus, a folding portion U1 in the shape of an inverted "U" is formed by the first-antenna feeder cable 13 and the conductive thin-film pattern 11b which is used as the folded element.

A first choke coil 14 is installed at a position which is located at a distance of λ/2 from the first-antenna feeding point 12 and in a region that includes a location at which the leakage current distribution reaches the maximum in the first-antenna feeder cable 13. The first choke coil 14 is used to stop the leakage current from the first antenna 10 and cause attenuation of the coupling current from the second antenna 20

As shown in FIG. 1(c), one end of a coaxial second-antenna feeder cable 23 is connected to the feeding point 22 of the second antenna 20. More specifically, one end of the core conductor 23d of the feeder cable 23 is connected to the conductive thin-film pattern 21a used for a main antenna element, one end of the outer conductor 23b of the feeder cable 23 is connected to the conductive thin-film pattern 21b used as a folded element, and the rest of the second-antenna feeder cable 23 is installed along the direction of the length of the circuit board 4 and parallel to an extended portion 13x of the first-antenna feeder cable 13. Thus, a folding portion U2 in the shape of an inverted "U" is formed by the second-antenna feeder cable 23 and the conductive thin-film pattern 21b used as a folded element.

A second choke coil 24 is installed at a position which is separated from the first choke coil 14 by a prescribed distance and is in a region that includes a location at which the leakage current distribution reaches the maximum in the second antenna 20. The second choke coil 24 is used to stop the leakage current from the second antenna.

FIG. 2 is a partially sectional plan view which illustrates the construction of the first and second choke coils of the radio communications diversity antenna of the embodiment. As shown in FIG. 2, the first choke coil 14 is formed by winding the coaxial first-antenna feeder cable 13 in a helical configuration which consists of approximately eight turns in cut-out areas 4a and 4b formed on both side edge portions of the printed circuit board 4. Meanwhile, the second choke coil 24 is formed by side-by-side winding (bifilar winding) of the first-antenna feeder cable 13 and second-antenna feeder cable 23 in a helical configuration which consists of approximately four turns of each cable in cut-out areas 4c and 4d formed on both side edge portions of the printed circuit board 4.

The electrical length between the first choke coil 14 and the second choke coil 24 is set to be an odd multiple of λ/4 (slightly less than three times in the embodiment, i.e., slightly less than 3λ/4), and the electrical lengths (numbers of turns) of the first and second choke coils 14 and 24, and the spacing between the first- and second-antenna feeder cables 13 and 23 and the second antenna 20 are also respectively adjusted and set, so that the distribution of the coupling current induced in the extended portion of the first-antenna feeder cable 13 is set to be the same phase as the phase of the maximum point of the antenna current distribution in the second antenna 20 (as will be described below). In FIG. 2, 13a indicates the outer covering of the first-antenna feeder cable 13 (D=ø1.5), 13b indicates the outer conductor of the cable 13, 13c indicates the intermediate insulating covering of the cable 13, and 13d indicates the core conductor of the cable 13.

The description now returns to FIG. 1. A short-circuiting means 30 is, for example, a shorting ring which short-circuits the outer conductors of the first-antenna feeder cable 13 and second-antenna feeder cable 23 and is provided in the vicinity of the area where the second choke coil is formed by the feeder cables 13 and 23. In other words, the short-circuiting means 30 is provided in the area of small currents with opposite phases (where a small coupling current and a small leakage current have opposite phases) which is located in the vicinity of the final-turn end of the second choke coil 24.

A coaxial connector 15 is connected to the end of the extended portion 13x of the first-antenna feeder cable 13, such an end being led out of the outer tube 1. Likewise, a coaxial connector 25 is connected to the end of an extended portion 23x of the second feeder cable 23.

Next, the operation of the radio communication diversity antenna of the embodiment constructed as described above will be described.

Figure 3:
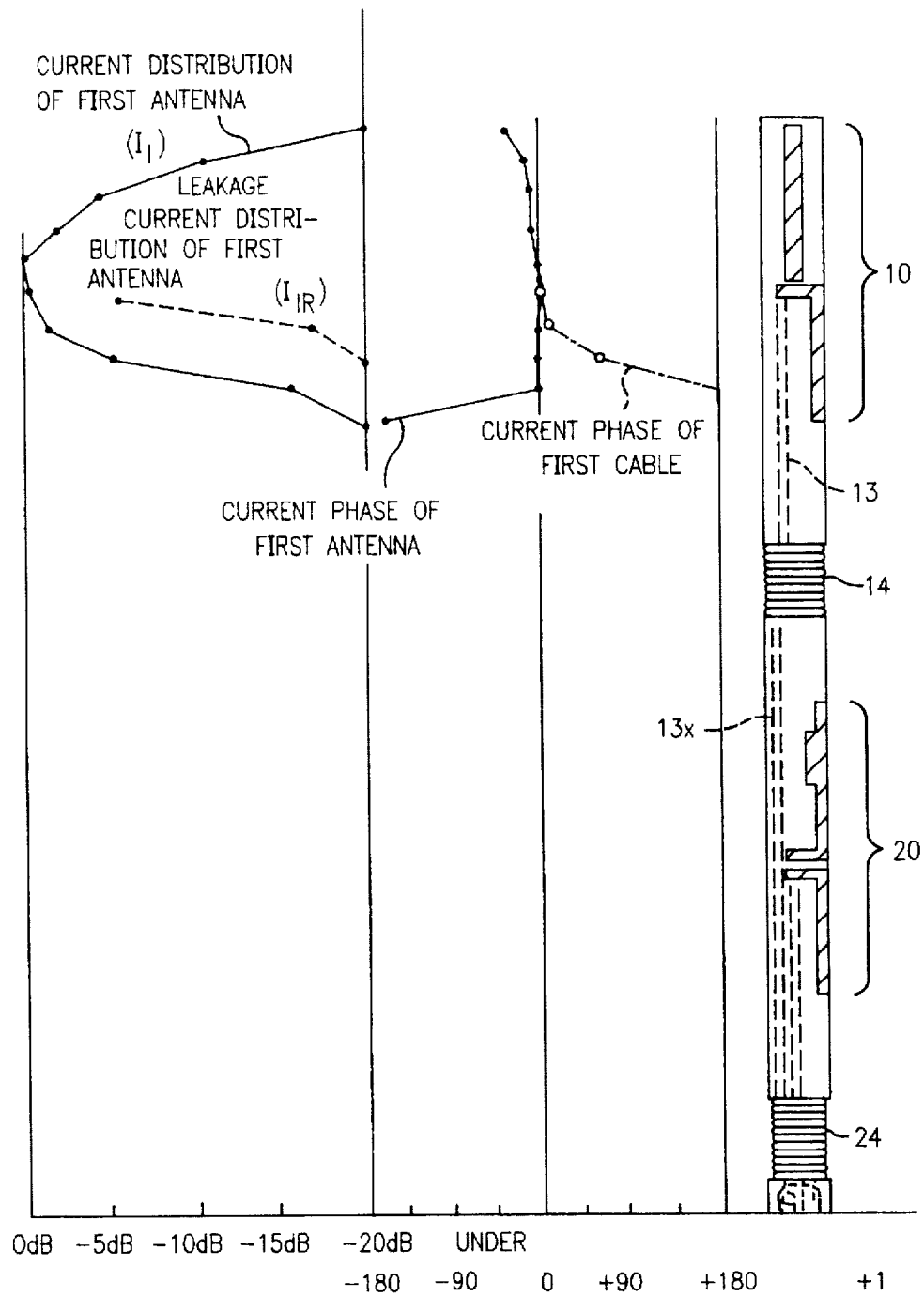
FIG. 3 is an explanatory diagram which illustrates the operation of the radio communication diversity antenna in the first embodiment of the present invention.

As shown in FIG. 3, a leakage current $I_{1R}$ of the first antenna 10 is stopped by the first choke coil 14 which is installed at the point where the leakage current distribution is the maximum. Accordingly, the leakage current has no effect on the second antenna.

Figure 4:
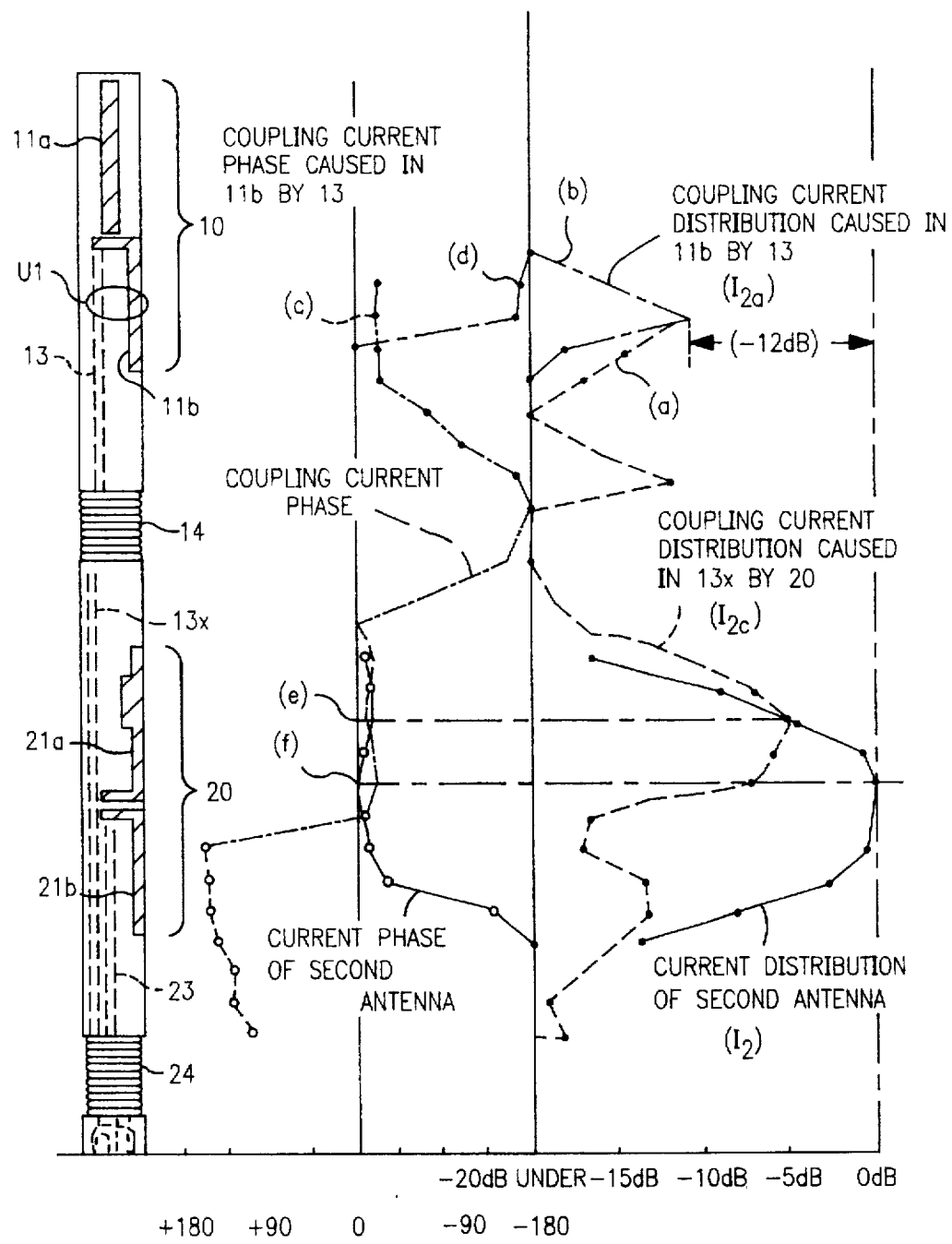
FIG. 4 is an explanatory diagram which illustrates the operation of the radio communication diversity antenna in the first embodiment of the present invention.

As shown in FIG. 4, the coupling current $I_{2c}$ is induced in the extended portion 13x of the first-antenna feeder cable 13 from the second antenna 20 when the antenna 20 is in operation. This coupling current $I_{2c}$ passes through the first choke coil 14 and flows into the first-antenna feeder cable 13. However, the coupling current flowing to the first antenna side is attenuated by the first choke coil 14. Accordingly, the absolute value of the coupling current is small; and in terms of the value actually measured, the coupling current is approximately −12dB compared to the maximum value of the antenna current $I_2$ of the second antenna 20 (in FIG. 4).

Furthermore, a coupling current $I_2$ also induced in the first antenna 10 (especially in the element 11b) by the coupling current that flows through the first-antenna feeder cable 13. However, the level of this coupling current $I_{2a}$ is small compared to the antenna current $I_2$ in the second antenna 20, and it is approximately −12dB in terms of the actually measured value ((b) in FIG. 4). In the above, the coupling current $I_{2c}$ flowing through the first-antenna feeder cable 13 has the same phase as the second antenna current ((c) in FIG. 4), while the coupling current $I_{2a}$ flowing through the first antenna 10 has the opposite phase ((d) in FIG. 4) to the second antenna current.

As a result, the coupling current $I_{2c}$ in the first-antenna feeder cable 13 and the coupling current $I_{2a}$ in the first antenna 10 have roughly the same level and roughly the opposite phases at the folding portion U1. Accordingly, these two currents deny each other and more or less canceled. As a result, the coupling currents $I_{2c}$ and $I_{2a}$ have very little effect on the radiation pattern of the second antenna 20.

Furthermore, the distribution of the coupling current $I_{2c}$ flowing through the extended portion 13x of the first-antenna feeder cable 13 during the operation of the second antenna 20 is determined by the spacing (which is set at slightly less than 3λ/4) between the first choke coil 14 and the second choke coil 24, the electrical lengths (numbers of turns) of the first choke coil 14 and the second choke coil 24, and the spacing between the conductive thin-film patterns 2a, 21b of the second antenna 20 and the extended portion 13x of the first-antenna feeder cable 13, etc., so that the phase of the maximum point of the coupling current distribution and the phase of the maximum point of the second antenna current distribution become the same ((e) and (g) in FIG. 4). Thus, any deleterious effect that might be exerted on the radiation pattern of the second antenna 20 by the coupling current $I_{2c}$ is eliminated.

The leakage current of the second antenna 20 and the coupling current present in the extended portion 13x of the first-antenna feeder cable 13 are stopped by the function of the second choke coil 24.

In the vicinity of the final-turn end of the second choke coil 24, the small coupling current flowing through the first-antenna feeder cable 13 and the small leakage current flowing through the second-antenna feeder cable 23 have opposite phases as described above. The short-circuiting means 30 which short-circuits the outer conductors of the cables 13 and 23 is installed in this area where the small currents have opposite phases, so that the outer conductors are shorted. As a result, the coupling current and the leakage current flowing through the outer conductors of the first-antenna feeder cable 13 and second-antenna feeder cable 23 are more or less completely stopped in the area where the small currents have opposite phases and therefore do not leak to the outside.

Thus, a radio communication diversity antenna is obtained which has approximately the same radiation pattern and gain characteristics as conventional antennas in which sleeve antenna parts and a shovel top are formed from pipes.

Figure 5A:
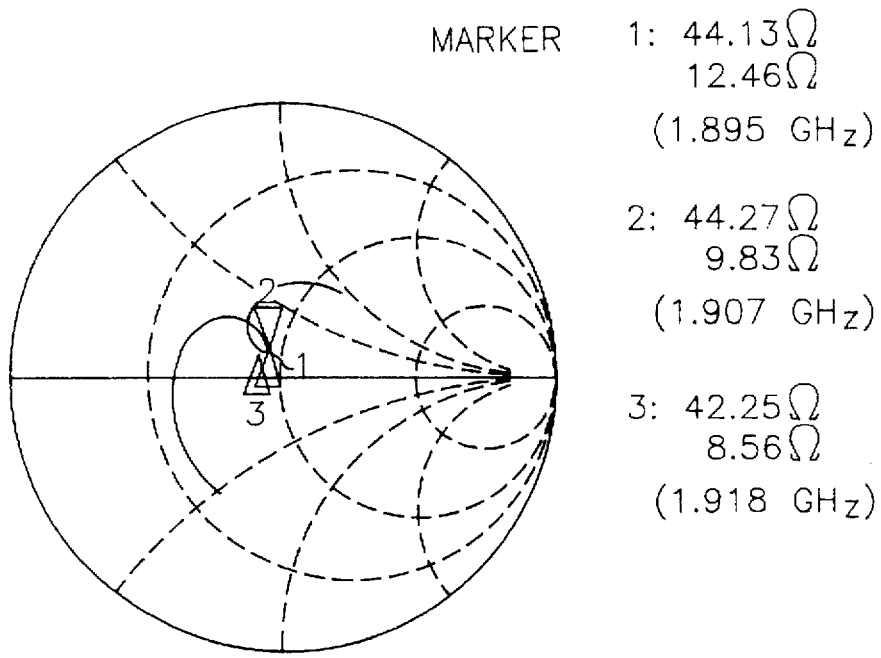
Figure 5B:
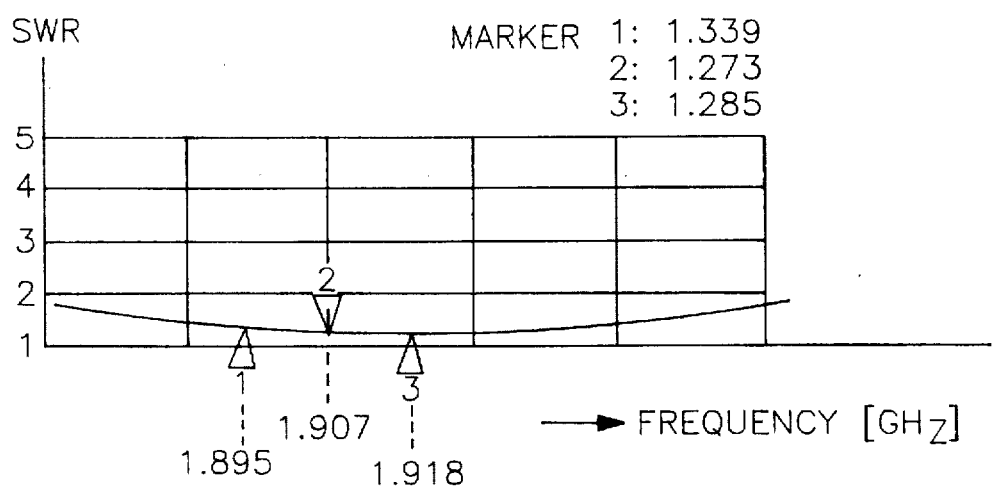

FIGS. 5(a) and (b) show the results of actual measurement of the characteristics of the first antenna of the radio communication diversity antenna of the embodiment. FIG. 5(a) is a Smith chart, and FIG. 5(b) is an SWR characteristic diagram. As is clear from FIG. 5(a), the impedance characteristics are close to $50\Omega \pm j_o$. Furthermore, as is clear from FIG. 5(b), the SWR value is 1.5 or less in the band used.

Figure 6A:
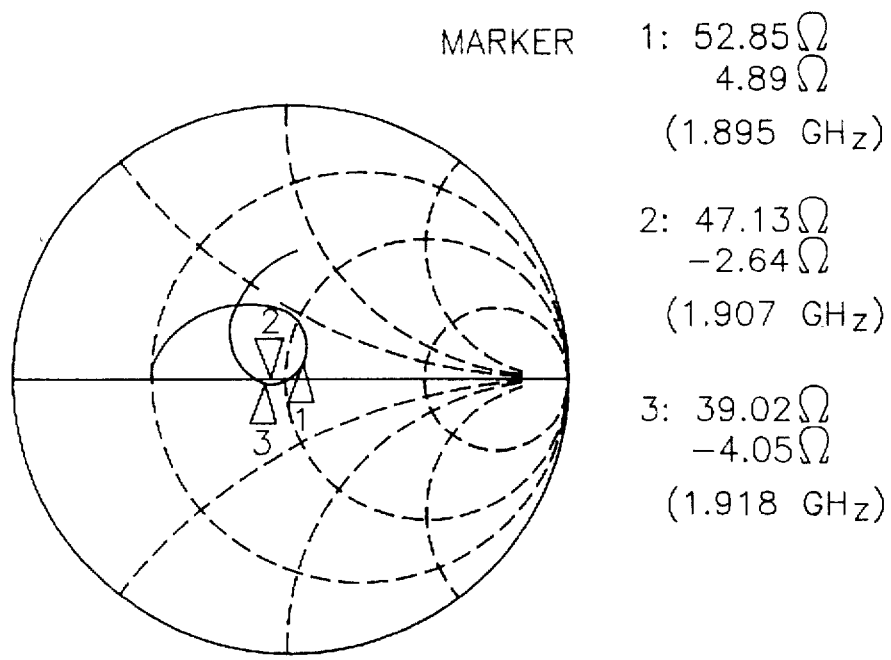
Figure 6B:
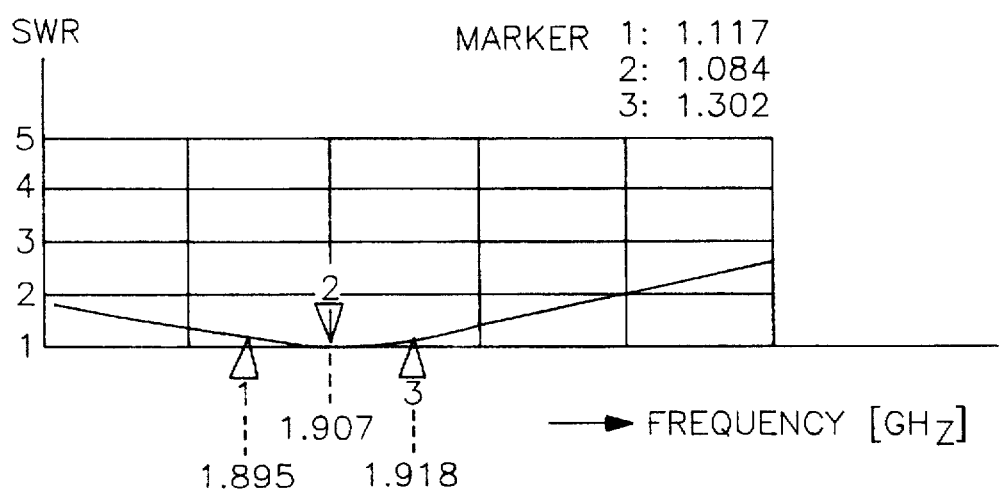

FIGS. 6(a) and (b) show the results of actual measurement of the characteristics of the second antenna of the radio communication diversity antenna of the embodiment. FIG. 6(a) is a Smith chart, and FIG. 6(b) is an SWR characteristic diagram. As is clear from FIG. 6(a), the impedance characteristics are even better than those shown in FIG. 5(a). Furthermore, as is clear from FIG. 6(b), the SWR value is 1.3 or less in the band used.

Figure 7A:
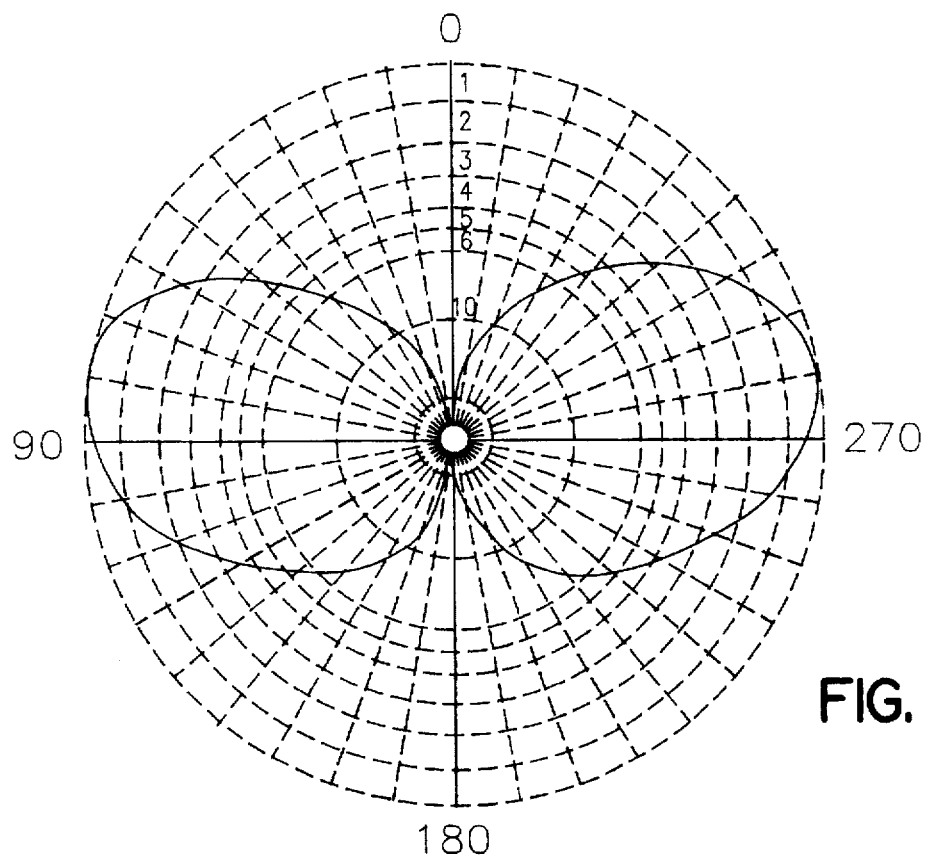
Figure 7B:
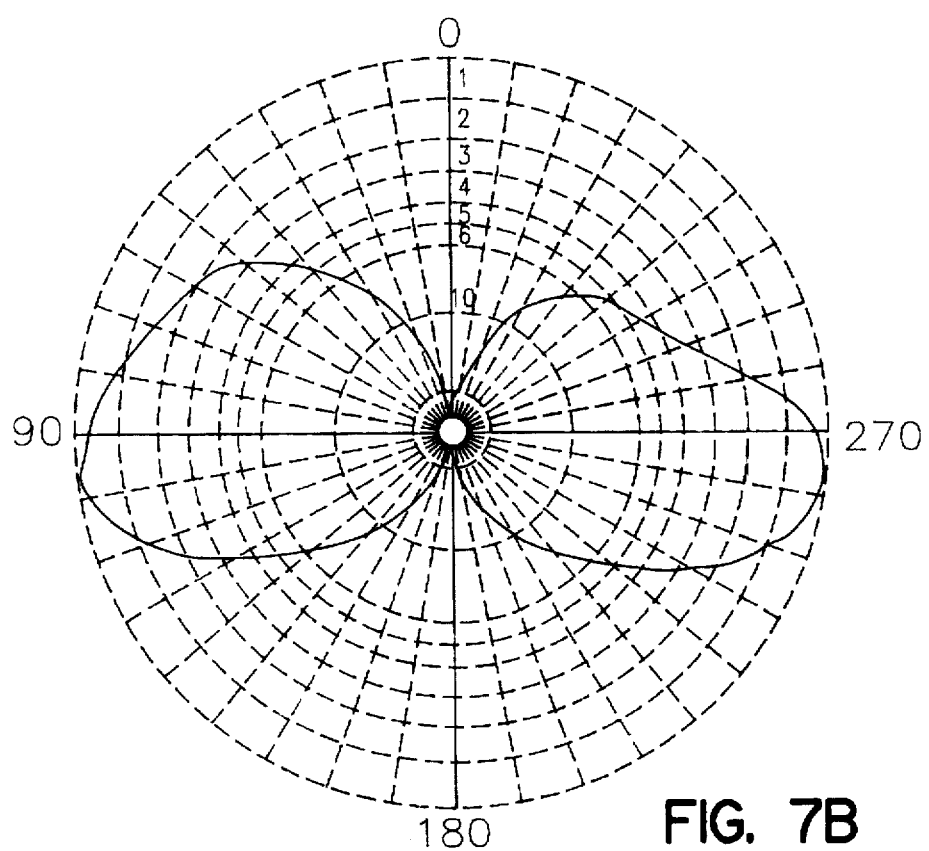

FIGS. 7(a) and (b) show the results of actual measurement of the vertical-plane radiation patterns of the radio communication diversity antenna of the embodiment. FIG. 7(a) shows the pattern diagram of the first antenna, and FIG. 7(b) shows the pattern diagram of the second antenna. As seen from FIGS. 7(a) and (b), the vertical-plane radiation pattern of the first antenna 10 and the vertical-plane radiation pattern of the second antenna 20 are roughly the same as those seen in the conventional antenna in which the antenna and other elements are constructed via pipes.

The structure and effects/merits of the embodiment above can be summarized as follows:

(1) In the radio communication diversity antenna of the embodiment, the conductive thin-film patterns 11a, 11b used for the first antenna and the conductive thin-film patterns 21a, 21b used for the second antenna are provided on the card-shaped printed circuit board 4 along the direction of the length of this circuit board 4. Furthermore, the first choke coil 14 which is used to stop the leakage current from the first antenna and cause attenuation of the coupling current $I_{2c}$ from the second antenna 20 is installed at a position which is at a distance of $\lambda/2$ from the feeding point 12 for the first antenna in which $\lambda$ is the wavelength of the electromagnetic waves in the frequency band used and at a location where the leakage current distribution of the first antenna reaches the maximum in the feeder cable 13 for the first antenna, and the second choke coil 24 which is used to stop the leakage current from the second antenna 20 is installed at a position which is separated from the first choke coil 14 by a prescribed distance and at a location where the leakage current of the second antenna 20 reaches the maximum in the feeder cable 23 for the second antenna.

Thus, since the antenna element is constructed merely by forming conductive thin-film patterns 11a, 11b and 21a, 21b on the card-shape printed circuit board 4, it is possible to obtain a radio communication diversity antenna which has a simple construction, a low cost of manufacture and a light weight compared to conventional antennas in which the antenna element is formed from pipes.

Furthermore, the first choke coil 14 which is used to stop the leakage current and cause the attenuation of the coupling current is installed at location where the leakage current distribution reaches the maximum in the first-antenna feeder cable 13. Accordingly, the flowing out of the leakage current from the first antenna 10 is prevented by the first choke coil 14, and there is no deleterious effect on the second antenna 20. Moreover, the coupling current $I_{2c}$ which is induced in the extended portion 13x of the first-antenna feeder cable from the second antenna 20 so as to flow into the first antenna side is greatly attenuated by the first choke coil 14. Accordingly, the amount of the coupling current $I_{2c}$ that flows into the first antenna side is extremely small.

In addition, the second choke coil 24 which is used to stop the leakage current is installed at a location where the leakage current distribution reaches the maximum in the second-antenna feeder cable 23. Accordingly, the flowing out of the leakage current from the second antenna 20 is stopped by the second choke coil 24.

(2) Furthermore, the radio communication diversity antenna of the embodiment is the antenna as described above wherein: the first antenna 10 consists of the conductive thin-film pattern 11a used for a main antenna element and the conductive thin-film pattern 11b used as a folded element, both of which being installed on the card-shaped printed circuit board along the direction of the length of the circuit board; the first-antenna feeder cable 13 is a cable with one end thereof being connected to the feeding point 12 located between the adjacent ends of the conductive thin-film patterns 11a, 11b and the rest of the cable being installed along the direction of the length of the circuit board 4; and the folding portion U1 is formed by the feeder cable 13 for the first antenna element and the conductive thin-film pattern 11b used as a folded element.

Accordingly, because of the relationship with the first choke coil 14, the coupling current $I_{2c}$ flowing through the feeder cable 13 for the first antenna and the coupling current $I_{2a}$ flowing through the first antenna 10 can have the same level but opposite phases. As a result, these two coupling currents ($I_{2c}$, $I_{2a}$) deny and cancel each other. Accordingly, there is no danger that the coupling current on the first antenna side will have a deleterious effect on the radiation patterns of the second antenna 20.

(3) Furthermore, the radio communication diversity antenna of the embodiment is the antenna as described wherein: the coupling current distribution in the extended portion 13x of the feeder cable 13 for the first antenna is set so that the phase of the maximum point of the coupling current distribution and the phase of the maximum point of the antenna current distribution in the second antenna 20 are the same, and such a setting is accomplished by setting the electrical length between the first and second choke coils 14, 24 to be an odd multiple of $\lambda/4$ (slightly less than $3\lambda/4$ in the embodiment) and by adjusting and setting the electrical lengths (numbers of turns) of the first and second choke coils 14, 24 and the respective spacing between the feeder cables 13, 23 for the first and second antennas and the second antenna 20.

Accordingly, there is no danger that the coupling current $I_{2c}$ induced in the extended portion 13x of the first-antenna feeder cable 13 which passes alongside the second antenna 20 will have a deleterious effect on the radiation pattern of the second antenna 20.

(4) Furthermore, the radio communication diversity antenna of the embodiment is the antenna as described above wherein: the first choke coil 14 is formed by winding the coaxial first-antenna feeder cable 13 in a helical configuration, and the second choke coil 24 is formed by the bifilar winding of the first-antenna feeder cable 13 and second-antenna feeder cable 23 in a helical configuration.

Accordingly, the construction of the antenna is simplified, since there is no need for separately installing the first and second choke coils. In particular, since the second choke coil 24 is a so-called bifilar-wound coil which includes not only the second-antenna feeder cable 23 but also the first-antenna feeder cable 13, spaces are efficiently utilized so that the antenna can be manufactured to be small in size and light in weight.

(5) Furthermore, the radio communication diversity antenna of the embodiment is the antenna described above wherein: the first-antenna feeder cable 13 and the second-antenna feeder cable 23 are both coaxial cables, the second choke coil 24 is formed by the bifilar winding of these feeder cables 13, 23 in a helical configuration with a prescribed number of turns (approximately four turns for each cable in the embodiment), and the short-circuiting means 30 which short-circuits the outer conductors of the cables 13, 23 is installed on the cables 13, 23 in an area where small currents of opposite phases exist, i.e. in an area where the small coupling current and small leakage current have opposite phases, so that such area is located in the vicinity of the final-turn end of the second choke coil 24.

Accordingly, a flowing out of the coupling current from the extended portion 13x of the first-antenna feeder cable 13 and of the leakage current from the second-antenna feeder cable 23 is substantially completely prevented.

(6) Furthermore, the radio communication diversity antenna of the embodiment includes: the card-shaped printed circuit board 4; the first antenna 10 consisting of the conductive thin-film pattern 11a used for a main antenna element and the conductive thin-film pattern 11b used as a folded element, both of which being formed on the card-shaped circuit board 4 along the direction of the length of the circuit board 4; the second antenna 20 consisting of the conductive thin-film pattern 21a used for a main antenna element and the conductive thin-film pattern 21b used as a folded element, both of which being formed on the printed circuit board 4 along the direction of the length of the circuit board 4 so as to be at a position which is separated from the first antenna 10 by a distance equal to an odd multiple of $\lambda/4$ (the separation being $3\lambda/4$ in case of this embodiment) where $\lambda$ is the wavelength of the electromagnetic waves in the frequency band used; the coaxial first-antenna feeder cable 13 which is installed so that one end thereof is connected to the feeding point 12 of the first antenna 10, and the rest of the cable 13 is provided along the direction of the length of the printed circuit board 4, thus forming the folding portion U1 as a result of the relationship between the cable 13 and the conductive thin-film pattern 11b used as a folded element; the first choke coil 14 which is formed by winding the first-antenna feeder cable 13 in a helical configuration at a position separated from the feeding point 12 by a distance of $\lambda/2$ and at a location where the leakage current distribution reaches the maximum in the first antenna 10, so that the leakage current from the first antenna is stopped and the coupling current $I_{2c}$ from the second antenna 20 is attenuated; the coaxial second-antenna feeder cable 23 which is installed so that one end thereof is connected to the feeding point 22 of the second antenna 20, and the rest of the cable 23 is provided along the direction of the length of the printed circuit board 4, thus forming the folding portion U2 as a result of the relationship between the cable 23 and the conductive thin-film pattern 21b used as a folded element; the second choke coil 24 which is formed by the bifilar winding of the first-antenna feeder cable 13 and the second-antenna feeder cable 23 in a helical configuration with a prescribed number of turns (four turns for each cable in the case of the embodiment), the second choke coil being provided at a position separated from the first choke coil 14 by a distance equal to an odd multiple of $\lambda/4$ (slightly less than $3\lambda/4$ in the case of the embodiment) and at a location where the leakage current distribution of the second antenna 20 reaches the maximum in the second-antenna feeder cable 23 so that the leakage current from the second antenna is stopped, the short-circuiting means 30 which short-circuits the outer conductors of the cables 13 and 23 and is installed in an area where small currents of opposite phases exist, such an area being located in the vicinity of the final-turn end of the second choke coil 24; and the means for setting the coupling current distribution in the extended portion 13x of the first-antenna feeder cable 13 so that the phase of the maximum point of the coupling current distribution in the extended portion 13x of the first-antenna feeder cable 13 and the phase of the maximum point of the antenna current distribution in the second antenna 20 become the same, the setting of the coupling current distribution being accomplished by adjusting the electrical lengths (numbers of turns) of the first and second choke coils 14 and 24 and the respective spacing between the first- and second-antenna feeder cables 13, 23 and the second antenna 20.

Accordingly, it is possible to obtain the radio communication diversity antenna which has all of the effects and merits described in (1) through (5) above.

(7) The antenna of the embodiment includes the following modifications:

An antenna that includes no outer tube 1.

An antenna that includes choke coils provided separately.

According to the present invention, it is possible to provide an antenna as follows:

(1) A diversity antenna for radio communications which has a simple structure, a low cost of manufacture and a light weight compared to conventional antennas in which the antenna element is formed from pipes and which has the necessary antenna characteristics.

(2) A diversity antenna for radio communications which has the necessary antenna characteristics, with virtually no problems arising from the leakage current caused by the connection of unbalanced cables to balanced antennas or from coupling current induced as a result of the coupling of antennas and cables.

We claim:

1. A space diversity antenna for a radio communications device, said antenna comprising: a first antenna and a second antenna, said first and second antennas comprising thin-film patterns provided on a card-shaped printed circuit board along a direction of a length of said circuit board, a first choke coil for stopping a leakage current from said first antenna and for causing attenuation of a coupling current from said second antenna provided at a position which is located at a distance of $\lambda/2$ from a feeding point of said first antenna where $\lambda$ is a wavelength of electromagnetic waves in a frequency band used and at a location where a leakage current distribution of said first antenna reaches a maximum in a feeder cable for said first antenna; and a second choke coil for stopping leakage current from said second antenna provided at a position separated from said first choke coil by a prescribed distance and at a location where the leakage current distribution of said second antenna reaches a maximum in a feeder cable for said second antenna; and wherein said first and second antennas are separated on said printed circuit board a distance equal to an odd multiple of $\lambda/4$, an electrical length between said first and second choke coils is set to be an odd multiple of $\lambda/4$, and electrical lengths of said first and second choke coils and a respective spacing between said feeder cable for said first antenna and said feeder cable for said second antenna and said second antenna are adjusted and set, so that a coupling current distribution in an extended portion of said feeder cable for said first antenna is such that a phase of maximum point of said coupling current distribution and a phase of maximum point of antenna current distribution in said second antenna become the same phase.

2. A diversity antenna for radio communications according to claim 1 wherein: said first antenna consists of a first conductive thin-film pattern which is used for a main antenna element and a second conductive thin-film pattern which is used as a folded element, both of which being installed on a card-shaped printed circuit board in a direction of length of said circuit board; said feeder cable for said first antenna is a cable which is connected at one end to a feeding point located between adjacent ends of said conductive thin-film patterns, the rest of said feeder cable for said first antenna being provided along a direction of length of said circuit board; and a folding portion is formed by said feeder cable for said first antenna element and said conductive thin-film pattern which is used as a folded element.

* * * * *